May 26, 1936.  G. E. BARTOL, JR  2,041,806
CUTTER
Filed Sept. 19, 1935

WITNESS:
Rob't R. Kitchel

INVENTOR
George E. Bartol, Jr.
BY
Busser & Harding
ATTORNEYS.

Patented May 26, 1936

2,041,806

UNITED STATES PATENT OFFICE 2,041,806

CUTTER

George E. Bartol, Jr., Wynnewood, Pa., assignor to C. Howard Hunt Pen Company, Camden, N. J., a corporation of New Jersey Application September 19, 1935, Serial No. 41,214

5 Claims. (Cl. 30—9)

This invention relates to an improvement in cutting tools adapted for carving and more particularly to cutters adapted for the incising or carving of linoleum.

Heretofore cutting tools for the incising or carving of linoleum have comprised a body of light, suitably hardened material of channel section, as a V-section, a U-section, or the like, formed at one end for entry into a handle and formed, as by beveling, at the opposite end to provide a cutting edge corresponding in shape to the cross-section of the body.

Such cutting tools have been found to be well adapted for the incising or carving of linoleum in the production, for example, of printing plates. However, a definite objection to such cutting tools, as heretofore known, has been that the end of the chip raised by the tool in making a cut engages the end of the handle by which the tool is manipulated and since linoleum is pliable rather than brittle the chip will not break off and hence obstruct the further advance of the tool or divert the direction of its advance. As a consequence, when incising or carving linoleum with the cutting tools heretofore known, it has been necessary to frequently lift the tool from the work in order to clear the chip, thus interrupting the smooth continued action of the tool.

Now in accordance with this invention, there is provided a cutting tool for the incising or carving of linoleum which is entirely free from the disadvantages possessed by such tools heretofore.

The exact nature, structure and operation of the cutting tool in accordance with this invention will appear from the following detailed description of preferred embodiments thereof with reference to the accompanying drawing in which.

Figure 3:
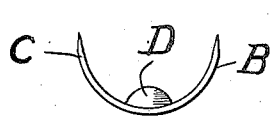
Figures 3, 4 and 6 are end views of cutting tools embodying this invention.
Figure 4:
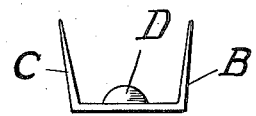

Referring to the several figures, B indicates a cutting tool more especially for carving linoleum, having a body portion of channel section, as a U-section, Figure 3, a ⌊/-section, Figure 4, a V-section, or the like. The body portion of the tool is formed at one end to enter a handle A and at its opposite end is beveled by grinding to form a cutting edge C.

Figure 1:
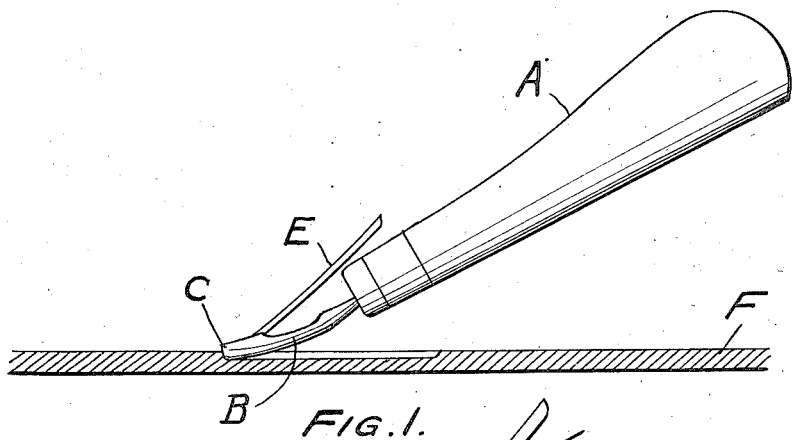
Figure 1 is a side view, partly in section, showing a cutting tool embodying this invention in operation.
Figure 2:
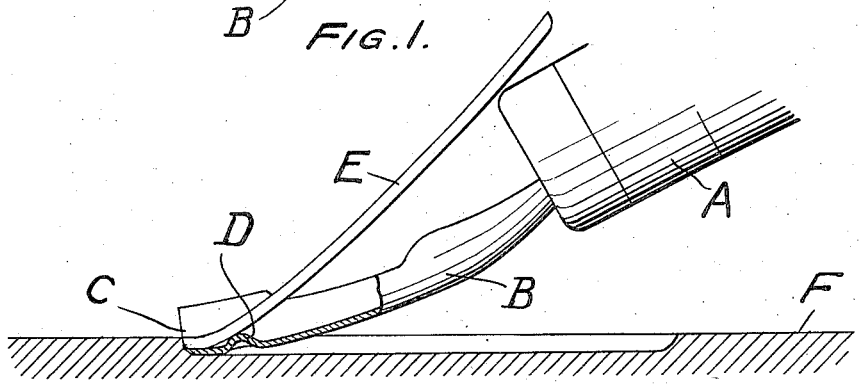
Figure 2 is a view similar to that of Figure 1 with the cutting tool shown partly in section.

In or about the bottom of the body of the tool B and at a point spaced back from the cutting edge C, the bottom of the tool is raised inwardly to form a curved hump D adapted, on the operation of the tool with respect, for example, to a piece of linoleum, to be contacted by the end of a chip E and to raise and divert or guide the chip out of its normal direction of extension with respect to the tool so that as the the tool is moved forward the chip will extend above and not contact with the end of the handle A, as shown in Figures 1 and 2.

Figure 6:
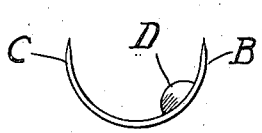
Figure 5:
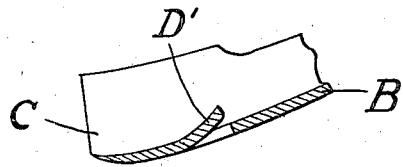
Figure 5 is a detailed sectional view of a modified form of this invention.

The hump or guide may be formed in various ways. Thus, a rearwardly and upwardly extending tongue D, Figure 5, may be raised inwardly of the body of the tool. Again, as shown in Figure 6, a hump D, or a tongue, may be provided on the side of the tool in order to divert a chip laterally out of its normal direction of extension.

It will now be appreciated that by virtue of the provision of means for guiding or diverting the chip raised in the advance of cutting tools of the type comprehended here, a cutting tool of increased efficiency and accuracy and free from a distinct disadvantage heretofore recognized in such cutting tools is made available.

It will be appreciated that the forms or embodiments of my invention herein illustrated and described are for the purpose of exemplification of my invention and that various modifications in detail may be made without departing from the scope of this invention as defined by the claims hereto appended.

What I claim and desire to protect by Letters Patent is:

1. A cutting tool comprising a body portion of channel section, a cutting edge formed at one end of the body portion and means carried by the body portion behind the cutting edge and adapted to divert a chip, raised in the advance of the tool, out of its normal direction of extension with respect to the tool.

2. A cutting tool comprising a body portion of channel section, a cutting edge formed at one end of the body portion and a guide formed by raising the body of the tool inwardly behind the cutting edge and adapted to divert a chip, raised in the advance of the tool, out of its normal direction of extension with respect to the tool.

3. A cutting tool comprising a body portion of channel section, a cutting edge formed at one end of the body portion and a tongue raised from the body of the tool adjacent to the cutting edge and extending upwardly and rearwardly with respect to the cutting edge and adapted to divert a chip raised in the advance of the tool, out of its normal direction of extension with respect to the tool.

4. A cutting tool comprising a body portion of channel section, a cutting edge formed at one end of the body portion and means positioned behind the cutting edge and at the bottom of the channel section and adapted to divert a chip, raised in the advance of the tool, out of its normal direction of extension with respect to the tool.

5. A cutting tool comprising a body portion of channel section, a cutting edge formed at one end of the body portion and means positioned behind the cutting edge so as to divert a chip, raised in the advance of the tool, laterally out of its normal direction of extension with respect to the tool.

GEORGE E. BARTOL, Jr.